US009432183B1

(12) United States Patent
Axnix et al.

(10) Patent No.: US 9,432,183 B1
(45) Date of Patent: Aug. 30, 2016

(54) ENCRYPTED DATA EXCHANGE BETWEEN COMPUTER SYSTEMS

(71) Applicant: International Business Machines Corporation, Armonk, NY (US)

(72) Inventors: Christine Axnix, Dettenhausen (DE); Ute Gaertner, Schoenaich (DE); Jakob C. Lang, Altdorf (DE); Angel Nunez Mencias, Stuttgart (DE); Christoph Raisch, Gerlingen (DE); Christopher S. Smith, Tamm (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/962,156

(22) Filed: Dec. 8, 2015

(51) Int. Cl.
*H04L 29/06* (2006.01)
*H04L 9/08* (2006.01)
*G06F 13/28* (2006.01)
*G06F 15/173* (2006.01)

(52) U.S. Cl.
CPC ............ *H04L 9/0819* (2013.01); *G06F 13/28* (2013.01); *G06F 15/17331* (2013.01); *H04L 9/0822* (2013.01)

(58) Field of Classification Search
CPC .... G06F 13/28; G06F 5/167; G06F 5/17331; H04L 9/0819
See application file for complete search history.

(56) References Cited

U.S. PATENT DOCUMENTS

| | | | |
|---|---|---|---|
| 7,512,663 B1* | 3/2009 | Kodama | G06F 15/16 709/212 |
| 8,275,996 B1 | 9/2012 | Melvin | |
| 9,037,820 B2* | 5/2015 | Ratn | G06F 11/1441 707/682 |
| 2005/0015645 A1* | 1/2005 | Vasudevan | H04L 69/168 714/5.11 |
| 2005/0226248 A1* | 10/2005 | Modi | H04L 63/065 370/395.5 |
| 2006/0200551 A1* | 9/2006 | Bali | H04L 43/0811 709/224 |
| 2008/0002578 A1* | 1/2008 | Coffman | H04L 47/10 370/230 |

(Continued)

OTHER PUBLICATIONS

Chhabra et al., "I-Nvmm: A Secure Non-Volatile Main Memory System With Incremental Encryption," ACM SIGARCH computer Architecture News—ISCA '11 vol. 39 Issue 3, Jun. 2011 pp. 177-188.

(Continued)

*Primary Examiner* — Hadi Armouche
*Assistant Examiner* — Sher A Khan
(74) *Attorney, Agent, or Firm* — Cantor Colburn LLP; Steven Chiu

(57) ABSTRACT

Aspects include encrypting data exchanged between two computer systems. A method includes accessing content of a memory, via a memory address, by at least one processing unit of one of the computer systems. Based on the accessing being a write operation, the content of the memory is encrypted using a memory encryption key, the encrypting is by a crypto unit of the at least one of the processing units. Based on the accessing being a read operation, the content of the memory is decrypted using the same memory encryption key, the decrypting is by a crypto unit of the at least once of the processing units. Remote direct memory access is established via memory addresses between the computer systems, the establishing including at least one of the computer systems locally storing a respective network encryption key as memory encryption keys for memory areas used for the data exchange.

14 Claims, 13 Drawing Sheets

(56) References Cited

U.S. PATENT DOCUMENTS

| | | | |
|---|---|---|---|
| 2011/0145561 A1 | 6/2011 | Anil | |
| 2011/0238992 A1 | 9/2011 | Jancula et al. | |
| 2012/0303948 A1* | 11/2012 | Auernhammer | H04L 9/00 713/150 |
| 2014/0222945 A1* | 8/2014 | Noronha | G06F 12/02 709/212 |
| 2015/0032835 A1* | 1/2015 | Sharp | G06F 15/167 709/212 |
| 2015/0067086 A1* | 3/2015 | Adriaens | H04L 67/1097 709/212 |
| 2015/0212951 A1 | 7/2015 | Franceschini et al. | |

OTHER PUBLICATIONS

Keramidas et al., "Using Value Locality to Reduce Memory Encryption Overhead in Embedded Processors,"; Emerging Technologies and Factory Automation, 2007. ETFA. IEEE Conference, 2 pages.

Christine Axnix, et al., Pending U.S. Appl. No. 15/137,080 entitled "Encrypted Data Exchange Between Computer Systems," filed with the U.S. Patent and Trademark Office on Apr. 25, 2016.

List of IBM Patents or Patent Applictions Treated As Related; (Appendix P), Filed: Dec. 8, 2015, 2 pages.

U.S. Appl. No. 15/137,080, filed Apr. 25, 2016.

* cited by examiner

ENCRYPTED DATA EXCHANGE BETWEEN COMPUTER SYSTEMS

BACKGROUND

The present invention relates in general to data processing systems, and in particular, to a method, system and computer program product for the exchange of encrypted data between computer systems using remote direct memory access.

Encryption is used to protect existing data in memory, as well as information in data files and other sources. Encryption can enhance protection in environments where securing data is physically difficult due to points of access to all networks. In addition, encrypting data is also used to protect data that is in transit, such as data being transferred via networks. This transient data may be submitted through the Internet and within a cloud computing environment using various computer systems, both wireline and wireless. As the technological savvy of hackers and related tools become more advanced, so is the need to create more advanced countermeasures to protect data.

Data transmitted in networks and data stored on persistent storage like disks or solid state devices (SSDs) increasingly needs to be encrypted for various business reasons. This encryption should preferably happen transparent to existing applications, with low overhead and low additional hardware cost.

Network data exchange to memory between different computer systems is known in prior art. For example remote direct memory access (RDMA) may be used by a computer system for getting access to data stored in the main memory of another computer system. Operating systems of the computer systems e.g. negotiate network encryption keys and encrypt/decrypt data before sending/after receiving data from the network. Thus, if used with a secure memory, the network data is encrypted/decrypted twice.

SUMMARY

Embodiments include a method, system, and computer program product for encrypting data exchanged between two computer systems with a network encryption key, the computer systems each comprising one or more processing units and a memory and at least one of the computer systems comprising at least one crypto unit. A method includes accessing content of the memory via a memory address, the accessing by at least one of the processing units of one of the computer systems. Based on the accessing being a write operation, the content of the memory is encrypted using a memory encryption key, the encrypting is by a crypto unit of the at least one of the processing units. Based on the accessing being a read operation, the content of the memory is decrypted using the same memory encryption key, the decrypting is by a crypto unit of the at least once of the processing units. Remote direct memory access is established via memory addresses between the computer systems, the establishing including at least one of the computer systems locally storing a respective network encryption key as memory encryption keys for memory areas used for the data exchange.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
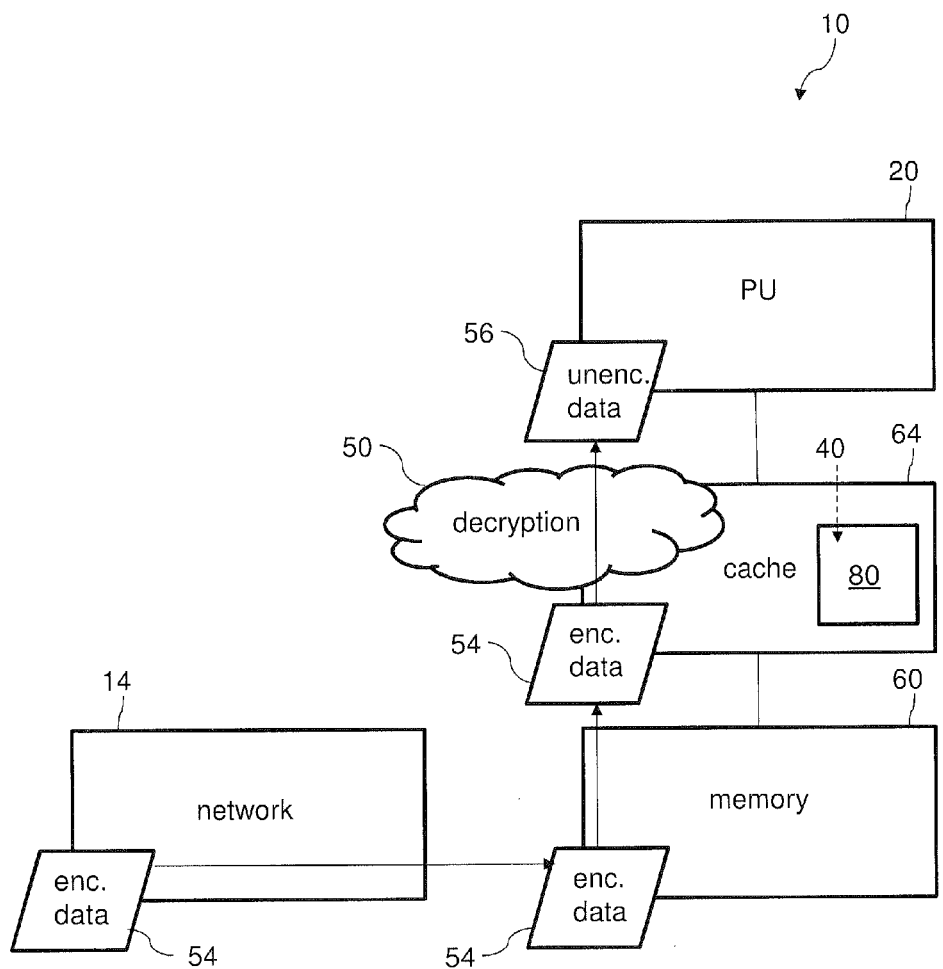
FIG. 1 is a system diagram of a computer system according to an embodiment of the invention using remote direct memory access (RDMA) for transferring encrypted data from a network to the computer system.

In the drawings, like elements are referred to with equal reference numerals. The drawings are merely schematic representations, not intended to portray specific parameters of embodiments of the invention. Moreover, the drawings are intended to depict only typical embodiments of the invention and therefore should not be considered as limiting the scope of the invention.

The illustrative embodiments described herein provide a method, system, and computer program product for the exchange of encrypted data between computer systems using remote direct memory access. The illustrative embodiments are sometimes described herein using particular technologies only as an example for the clarity of the description.

The illustrative embodiments may be used for encrypting data exchanged between two computer systems 10, 12 with a network encryption key 40, the computer systems 10, 12 each comprising one or more processing units 20, 22 and a memory 60 as well as at least one of the computer systems 10, 12 comprising at least one crypto unit 50, 51, wherein at least one of the processing units 20, 22 of one of the computer systems 10, 12 accesses the memory 60 via memory addresses 30, 32.

Reference numerals hereby refer to elements shown in the FIGS. 1 to 14.

The content of the memory 60 in the computer system 10, 12, being written by at least one of its processing units 20, 22, is configured to be encrypted by its crypto unit 50, 51 using a memory encryption key 42. The content of the memory 60, being read by at least one of its processing units 20, 22, is configured to be decrypted by its crypto unit 50, 51 using the same memory encryption key 42. The computer systems 10, 12 further comprise at least one I/O adapter 24, 26 each to establish remote direct memory access 62 via memory addresses 30, 32 between the computer systems 10, 12. The method comprises at least one computer system 10, 12 locally storing the respective network encryption keys 40 as memory encryption keys 42 for memory areas 65 used for the data exchange.

FIG. 1 shows a system diagram of a computer system 10 according to an embodiment of the invention using remote direct memory access (RDMA) for transferring encrypted data 54 from a network 14 to the computer system 10. FIG. 1 shows how the encrypted data 54 is transferred from the network 14 and is stored unchanged into the memory 60 using RDMA. When the processing unit 20 fetches the data 54 from the memory 60, i.e. reads the data 54 received from the network 14, the cache hardware 64 decrypts the data 54, via e.g. a crypto unit 50, using the network encryption key 40 stored in the memory key table 80 of the cache 64, so that it arrives in the processing unit 20 as unencrypted data 56. For writing data 56 to the memory 60 before sending it to the network 14, the cache hardware 64 encrypts the data 56 using the network encryption key 40 in the memory key table 80 via the crypto unit 50. In a following step the data may be moved to the network 14.

Figure 2:
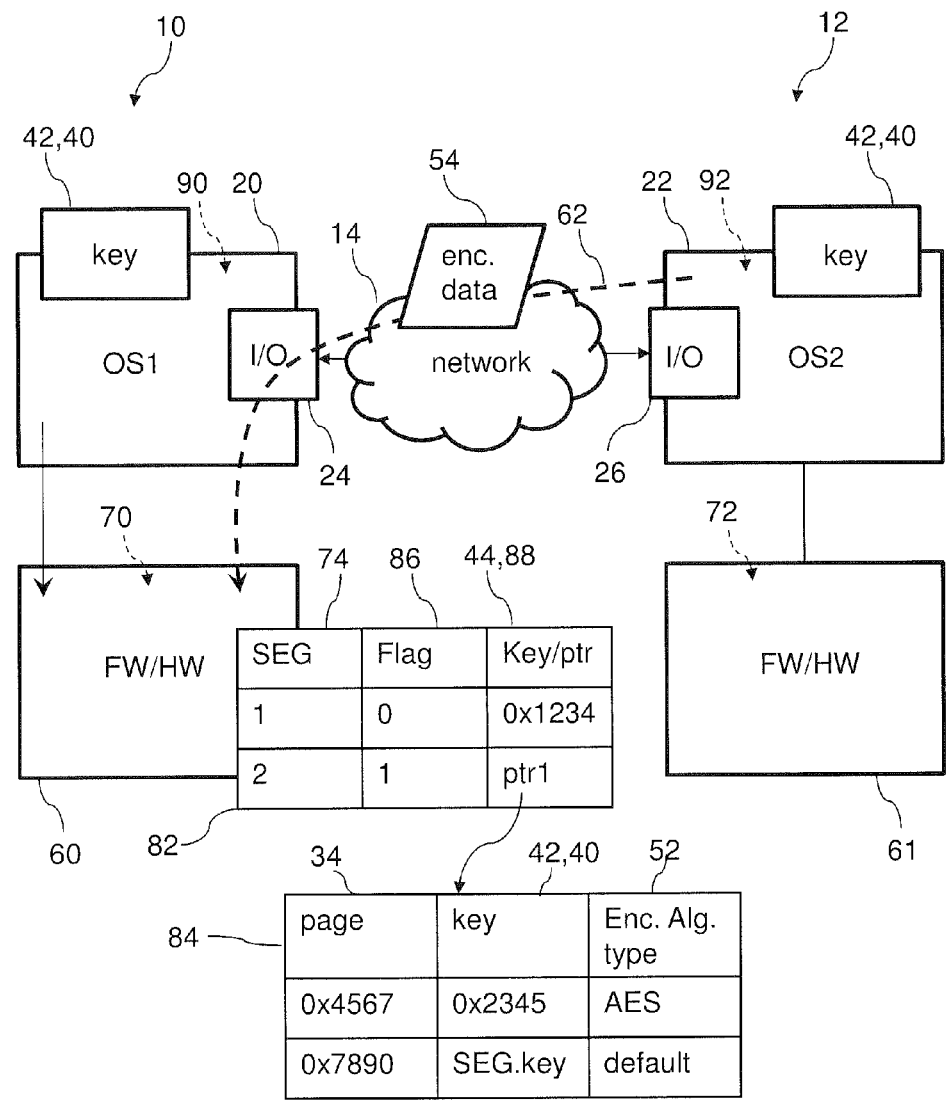
FIG. 2 is a system diagram of two computer systems according to an embodiment of the invention using RDMA for storing encrypted data of one of the computer systems to the remote memory of the other computer system.

FIG. 2 depicts a system diagram of two computer systems 10, 12 according to an embodiment of the invention using RDMA for storing encrypted data 54 of one of the computer systems 12 to the remote memory 60 of the other computer system 10. The computer systems 10, 12 comprise processing units 20, 22 running operating systems 90, 92. The processing units 20, 22 are connected to memories 60, 61 comprising firmware/hardware (FW/HW) functionality. The processing units 20, 22 comprise input/output (I/O) adapters 24, 26 being connected via the network 14 to each other. For encryption/decryption of data the processing units 20, 22 are equipped with the memory encryption key 42, being exchanged by the network encryption key 40. According to the inventive method the operating systems 90, 92 of the computer systems 10, 12 are negotiating the network encryption keys 40 for performing remote direct memory access 62 of one of the computer systems 10, 12 to another computer system 12, 10. Thus one of the computer systems 10, 12 is storing and/or reading data encrypted by the network encryption keys 40 directly via remote direct memory access 62 on the main memory 60 of another computer system 12, 10. The operating systems 90, 92 are communicating the network encryption keys 40 to the firmware 70, 72 via an instruction. The firmware 70, 72 is modifying a memory segment table 82 and creating or modifying a page table 84 by setting a flag 86 in the memory segment table 82 and adding a pointer 88 pointing to the page table 84 as well as adding a page address 34, a network encryption key 40 and an encryption type 52 to the page table 84. The flag 86 may be used e.g. to indicate if information in a specific column in the memory segment table 82 is to be interpreted as a segment key 44 or a pointer 88.

The memory segment table 82 thus comprises the segment number 74 (indicated in the table as 1, 2), the flag 86 (which has a value of 0 or 1) as well as the segment key 44 (e.g. 0x1234 in the table) and the pointer 88 (e.g. ptr1), respectively, if a memory segment is to be referenced on a page granularity. For this purpose the pointer 88 is pointing to the page table 84. The page table 84 comprises the page address 34 (indicated in the table e.g. as 0x4567, 0x7890), the memory encryption key 42 (indicated in the table e.g. as 0x2345, or a segment key like a default key 0x1111), being replaced by the network encryption key 40 as well as an encryption mode 52 (indicated in the table as AES or a default value). Both tables 82, 84 are stored in a secure area of the memory 60, 61, reserved for the firmware 70, 72. In case the network encryption keys 40 are being changed on a local computer system 10, 12, data are being re-encrypted.

In the embodiment shown in FIG. 2 encrypted data 54 of the computer system 12 are written as new pages to the memory 60 of the computer system 10. For this purpose the encrypted data 54, encrypted with the network encryption key 40 used as the memory encryption key 42 by the processing unit 22, are transferred in a remote direct memory access process (RDMA) from the processing unit 22 via the I/O adapter 26 via the network 14 and via the I/O adapter 24 directly to the memory 60, using the corresponding segment table 82 and page table 84, respectively.

Figure 3:
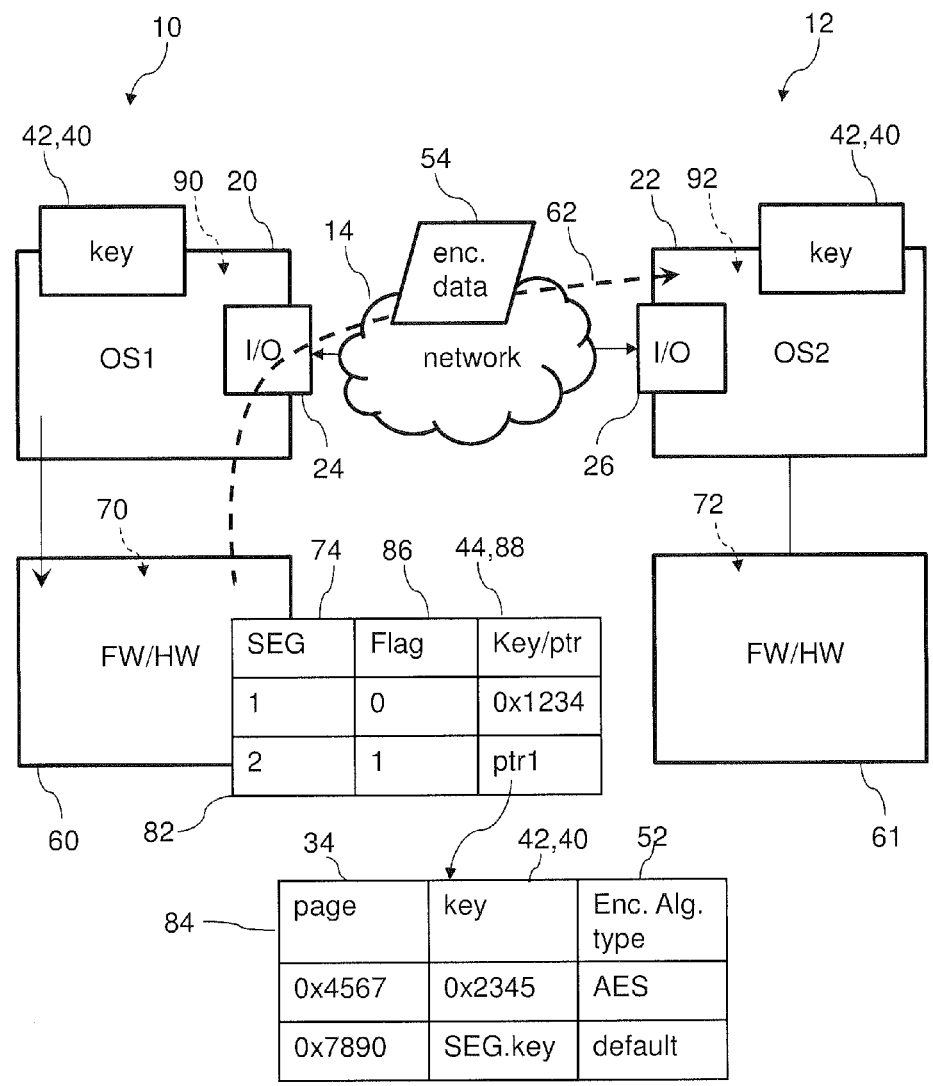
FIG. 3 is a system diagram of the two computer systems according to FIG. 2 using RDMA for fetching encrypted data from the remote memory of one of the computer systems by the other computer system in accordance with an embodiment.

FIG. 3 depicts the system diagram of the two computer systems 10, 12 according to FIG. 2 using RDMA for fetching encrypted data 54 from the remote memory 60 of one of the computer systems 10 by the other computer system 12. In the embodiment shown in FIG. 3 existing pages with encrypted data 54 of the computer system 10 are read by the processing unit 22 of the computer system 12. For this purpose the encrypted data 54, encrypted with the network encryption key 40 used as the memory encryption key 42 by the processing unit 20, may be transferred in a remote direct memory access process (RDMA) from the memory 60 via the I/O adapter 24 via the network 14 and via the I/O adapter 26 to the processing unit 22 of the computer system 12, using the corresponding segment table 82 and page table 84, respectively.

Figure 4:
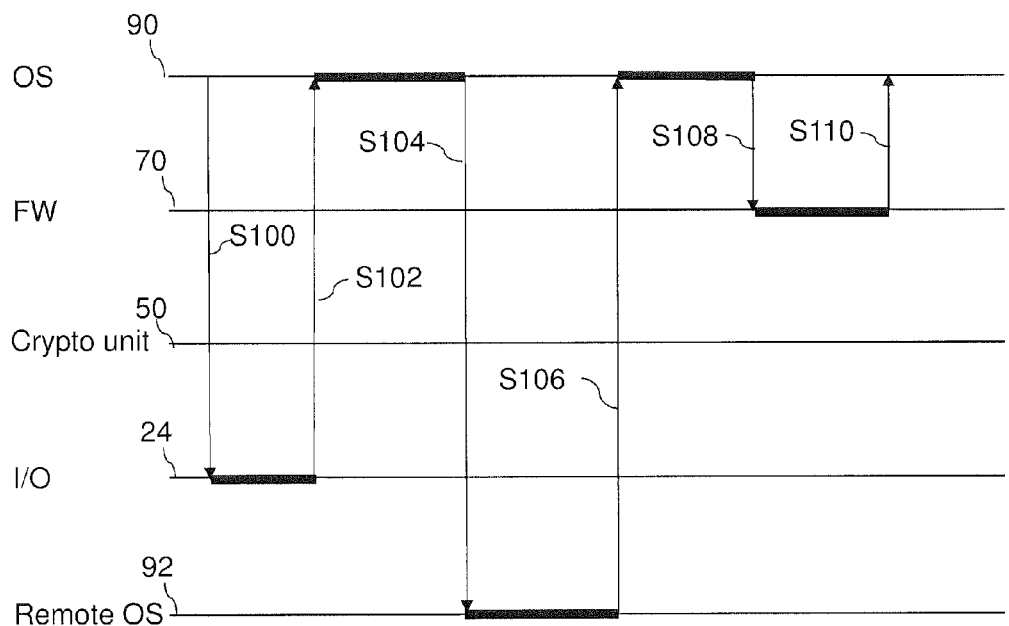
FIG. 4 is a sequence of operations for the initialization of network communication according to an embodiment of the invention.

In FIG. 4 a sequence of operations for the initialization of network communication according to an embodiment of the invention is depicted. In the embodiment of FIG. 2 the data are written by the computer system 12 in an RDMA process directly to the memory 60 of the computer system 10, whereas in the embodiment of FIG. 3 the data are read by the computer system 12 in an RDMA process directly from the memory 60 of the computer system 10. For initializing such a process the operating system 90 of the computer system 10 in step S100 initiates setting the RDMA memory area for writing in the I/O adapter 24, e.g. setting I/O queues passing the firmware 70 as well as the crypto unit 50 of the computer system 10. Next in step S102 control is back to the operating system 90, followed by negotiating the encryption type 52 as well as the network encryption key 40 in step S104 with the remote operating system 92. After giving control back to the operating system 90 in step S106, in step S108 the corresponding network encryption key 40 is set as the memory encryption key 42 in the firmware's segment table 82 and page table 84 is set up. In step S110 control is going back to the OS 90.

Figure 5:
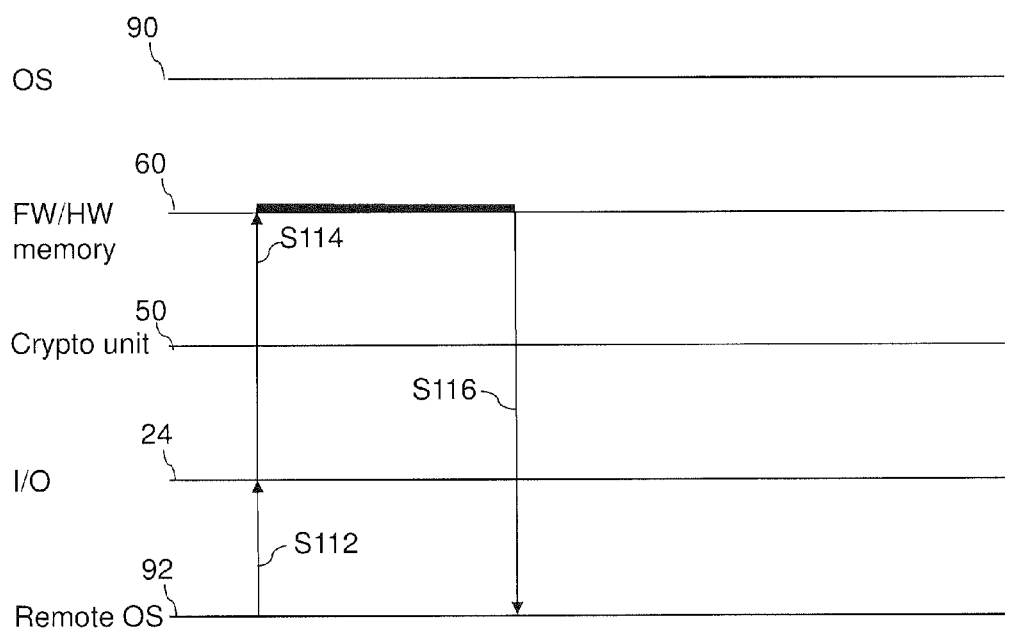
FIG. 5 is a sequence of operations for network communication according to an embodiment of the invention.

In FIG. 5 a sequence of operations for network communication according to an embodiment of the invention is shown. In this embodiment the remote operating system (OS) 92 is sending in step S112 the encrypted data 54 via an RDMA process to the I/O adapter 24 of the computer system 10. From there the encrypted data 54 are written via RDMA to the memory 60 in step S114. Next in step S116 control is given back to the remote OS 92.

Figure 6:
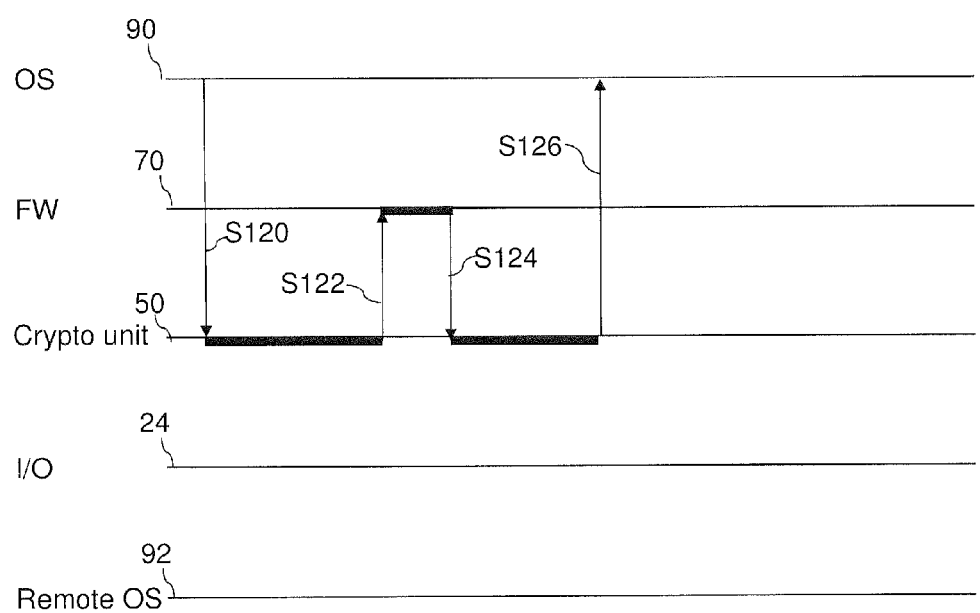
FIG. 6 is a sequence of operations for the usage of network data in the memory according to an embodiment of the invention.

FIG. 6 shows a sequence of operations for the usage of network data in the memory 60 according to an embodiment of the invention. In step S120 data are read from or written to the crypto unit 50. Next in step S122 the appropriate memory encryption key 42 is loaded from the segment table 82 or page table 84, respectively, being stored in the firmware 70 to the crypto unit 50 and the crypto unit 50 set up for the right encryption type 52. If the memory segment is the same as before, the memory encryption key 42 is kept in the cache 64 and not reloaded. If the wrong memory encryption key 42 is set, the memory encryption key 42 is cleared and optionally also the cache 64 is cleared. In step S124, if the memory encryption key 42 for the memory segment is set, the data are encrypted with the memory encryption key 42 in order to write the data or the data are decrypted with the memory encryption key 42 in order to read the data, respectively. Next in step S126, control going back to the OS 90, writing of the data is complete or the data to read is ready to use, respectively.

Figure 7:
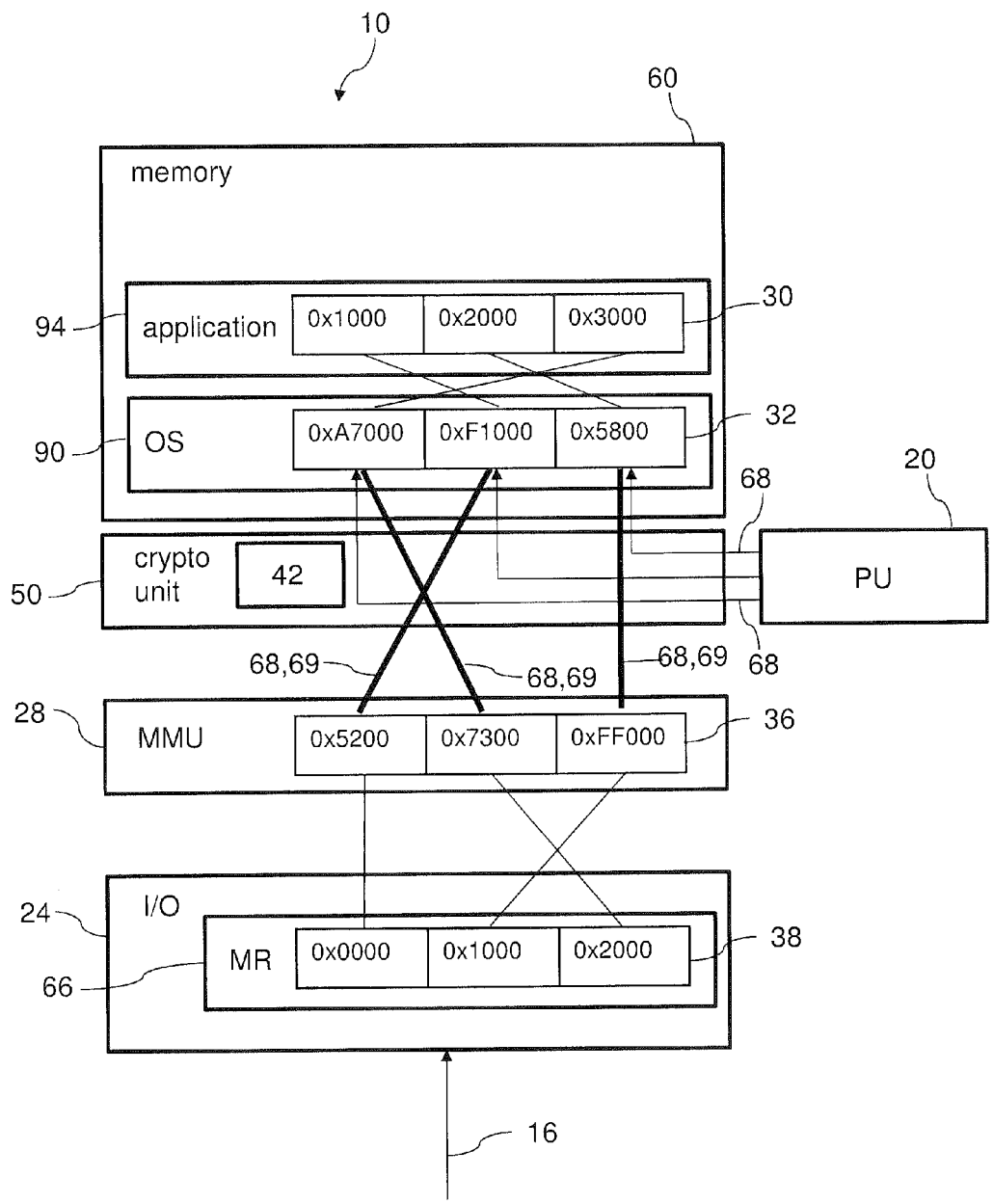
FIG. 7 is a system diagram of the reuse of a crypto unit for RDMA encryption according to an embodiment of the invention.

In FIG. 7 a system diagram of the reuse of a crypto unit 50 for RDMA encryption according to an embodiment of the invention is depicted. The system diagram shows the memory 60 with areas for the operating system 90 operating on physical addresses 32 as well as an application 94 operating on virtual addresses 30. The virtual addresses 30 are referenced to the physical addresses. The processing unit 20 may access the memory 60 via the crypto unit 50 with an unencrypted access 68, because the crypto unit 50 encrypts or decrypts data written or read, respectively with the appropriate memory encryption keys 42 replaced by the network encryption keys 40. The I/O adapter 24 gets input 16 from a remote computer system (not shown) and comprises memory region address offsets 38 in a memory segment 66 for RDMA processes. Data from/to the remote location input 16 are transferred to/from a memory mapping unit 28 comprising bus address offsets 36. The I/O adapter 24 reuses the same encryption/decryption mechanism to the memory 60 as the processing unit 20. For this purpose the crypto unit 50 comprises a second access path to select encrypted/unencrypted access from the I/O adapter 24 per memory page. This is realized with unencrypted/encrypted access 68, 69 from the memory mapping unit 28 via the crypto unit 50 directly to the memory 60.

In case of storing new data to the memory 60, the operating system 90 may communicate virtual memory addresses 30 and/or physical memory addresses 32 as well as the corresponding network encryption key 40 to firmware 70 of the computer system 10. In case of reading existing data from the memory 60, the operating system 90 may communicate virtual memory addresses 30 and/or physical memory addresses 32 and read the corresponding network key 40 from firmware 70 of the computer system 10 via a new instruction.

Figure 8:
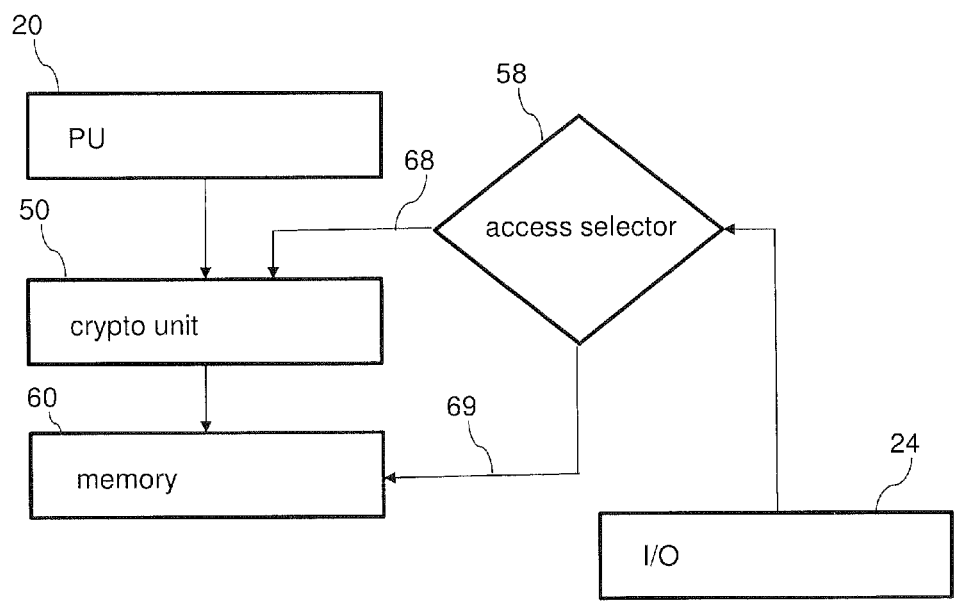
FIG. 8 is a system diagram of access selection performed by an input/output (I/O) adapter according to an embodiment of the invention.

FIG. 8 shows a system diagram of access selection performed by an I/O adapter 24 according to an embodiment of the invention, where access selection is performed on a memory page basis. The crypto unit 50 may be configured with an access selector 58 for selecting encrypted access 69 or unencrypted access 68 from the I/O adapter 24, 26. The I/O adapter 24 therefore gets access to unencrypted data 56 for control of the I/O adapter 24 and network addressing information as well as access to encrypted data 54 for user data in memory segments via the system memory 60.

Figure 9:
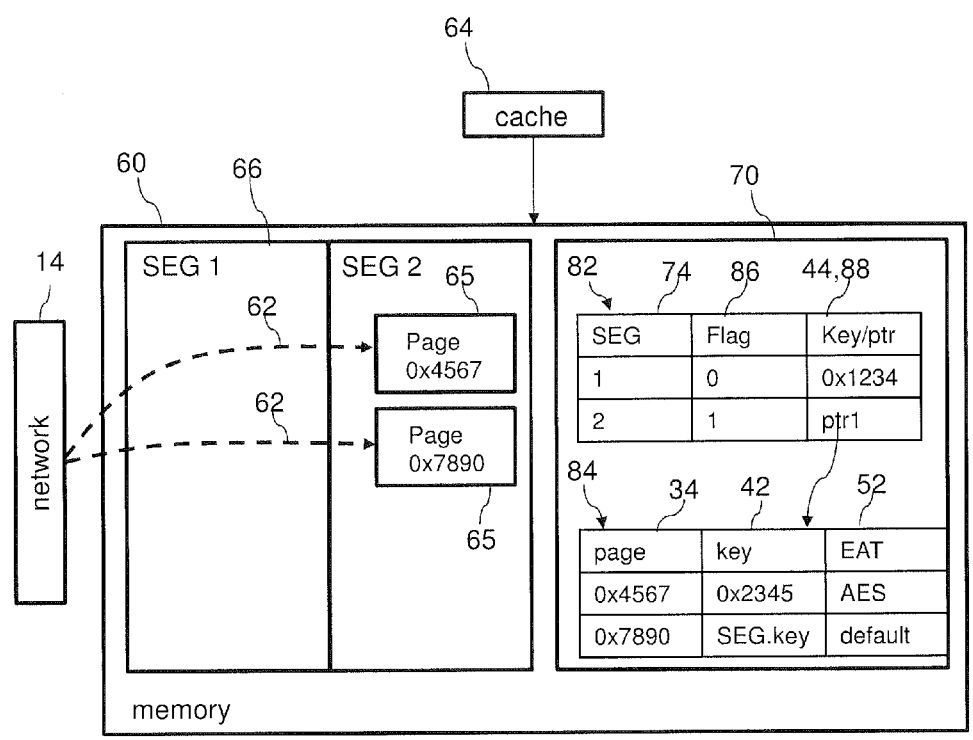
FIG. 9 is a system diagram with a memory layout according to an embodiment of the invention.

FIG. 9 depicts a system diagram with a memory layout according to an embodiment of the invention. The memory 60 may be divided into a firmware region 70, as well as a memory segment region 66. The memory segment table 82 with segment numbers (in the table as 1, 2), the flag 86 (in the table as 0, 1), the segment key 44 (in the table as 0x1234), and the pointer 88 (in the table as ptr1), as well as the page table 84 with page addresses 34 (in the table as 0x4567, 0x7890), memory encryption keys 42 (in the table as 0x2345, or a segment key), and the encryption type 52 (in the table as AES, or default) are both located in the secure firmware 70. Negotiated network encryption keys 40 can be set in the page table 84 as memory encryption keys 42 including non-default encryption types or encryption algorithms. A new bit is set for the access selector 58.

The memory segment region 66 comprises two segments SEG1 and SEG2, where in SEG2 two pages are depicted with the corresponding page addresses (0x4567, 0x7890) from the page table 84. The pages are written/read via an RDMA process 62 from the network 14. The memory 60 is accessed from the cache 64 too. Thus the I/O adapter 24, 26 are being configured for selecting an access to unencrypted data of the crypto unit 50 and/or an access to encrypted data in the memory 60.

Figure 10:
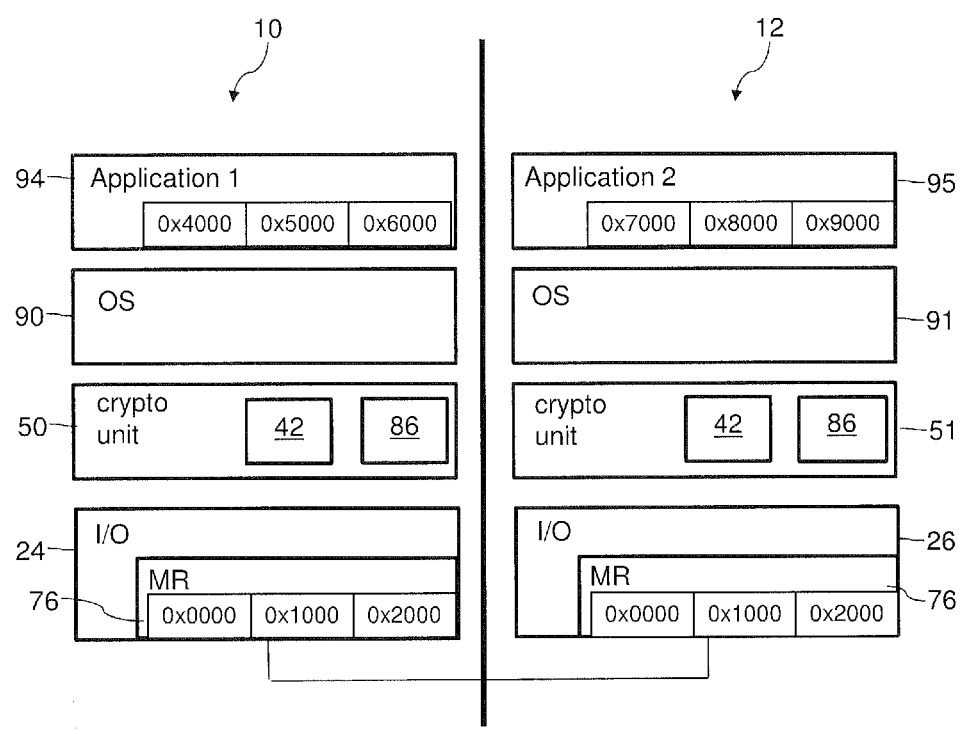
FIG. 10 is a system diagram of the synchronization of crypto units according to an embodiment of the invention.

In FIG. 10 a system diagram of the synchronization of crypto units 50, 51 according to an embodiment of the invention is shown. Crypto units 50, 51 of the computer systems 10, 12 are being synchronized by exchanging the network encryption keys 40 for remote direct memory access 62 of the computer systems 10, 12. In doing so, the crypto units 50, 51 have the same key for the same offset in the memory region 76. For this purpose the first OS 90 may allocate physical pages and register a set of first keys for the addresses 0x4000 to 0x6000 in the local crypto unit 50. The second OS 91 also allocates physical pages and registers a set of second keys for the addresses 0x7000 to 0x9000 in the local crypto unit 51. The first application 1 generates data at the addresses 0x4000 to 0x6000, whereas the second application 2 generates data at the addresses 0x7000 to 0x9000 for remote access.

The OS 91 generates mappings in the memory mapping unit 28 (shown in FIG. 10) for the addresses 0x7000 to 0x9000 and further generates a memory region 76 in the local I/O adapter for remote access. The first application generates access structures for the local I/O adapter 24 corresponding to the access structures of the OS 91 before. The second application 2 transmits an identifier of the memory region 76 and the keys B to the first application 1. The first application 1 exchanges the keys in its local crypto unit 50 to the second keys and re-encrypts the local data from the first keys to the second keys. The keys are now synchronized between both computer systems 10 and 12. Next the first application 1 initiates data transfer on the first I/O adapter 24 to copy the encrypted data to the second application 2 through the memory region 76. This is performed by using control structures in unencrypted pages. As the second crypto unit 51 is synchronized the second application 2 has now access to a data copy of the first application 1.

According to an alternative embodiment the first keys may also be synchronized by transmitting the first keys to the second application 2 with key exchange and re-encrypting the data on the second computer system 12. If the second computer system has completely unused pages and initial zeroing of the receive side is not required by the second application, the re-encrypt step may be skipped.

Alternatively the computer systems 10, 12 may also be a storage device which would correspond to encrypted access on storage data blocks. For write access the second computer system 12 in FIG. 10 would be replaced by a storage device for read access on the first computer system 10. Preferably the unencrypted metadata information transmitted between the OS 90, 91 and the I/O adapter 24, 26, respectively, may be signed.

Figure 11:
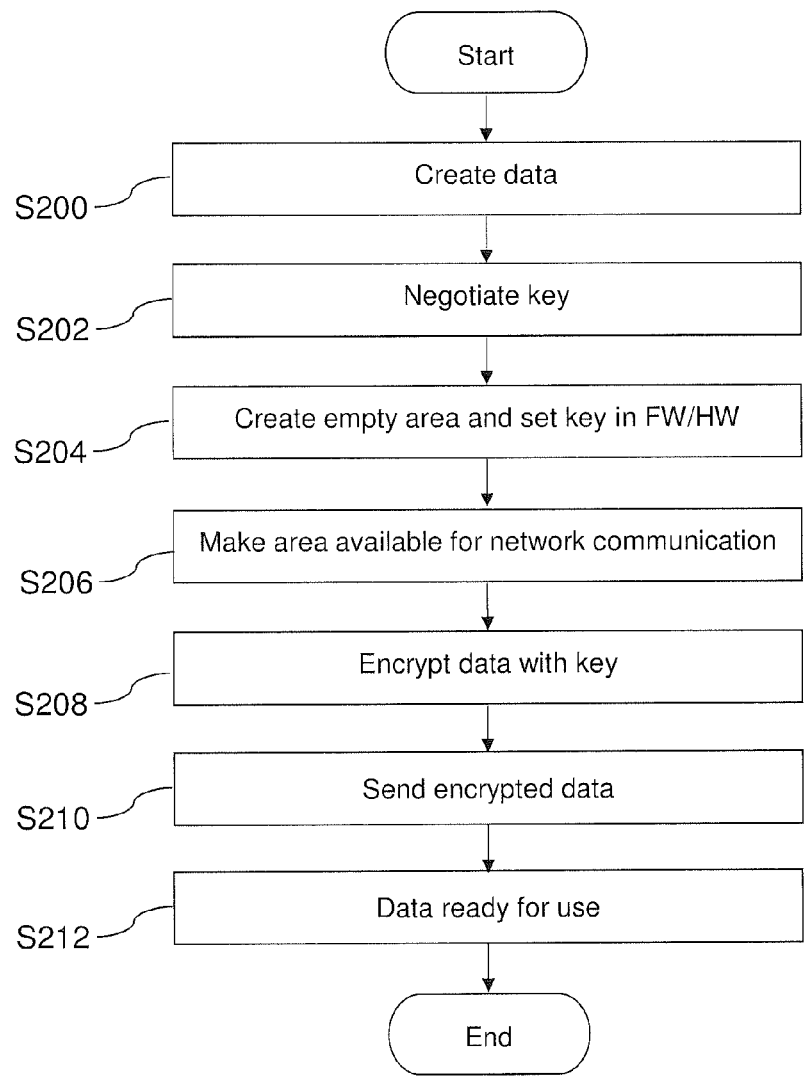
FIG. 11 is a flowchart of operating system (OS) to OS communication for remote writing in a new remote memory section according to an embodiment of the invention.

FIG. 11 shows a flowchart of a communication between a first computer system and a second computer system for remote writing in a new remote memory section according to an embodiment of the invention. First, data are created on the first OS in step S200. Next both OS negotiate their keys in step S202. Then the second OS creates an empty memory area and puts the key to a segment table or a page table in step S204. Thus the key is set in FW/HW. Next in step S206 the memory area is made available to network communication by the second OS, whereas in step S208 the data are encrypted with the key by the first OS. Next in step S210 the encrypted data are sent by the first OS to the second OS via the network. In step S212, thus the data are ready for use in the memory section of the second computer system.

Figure 12:
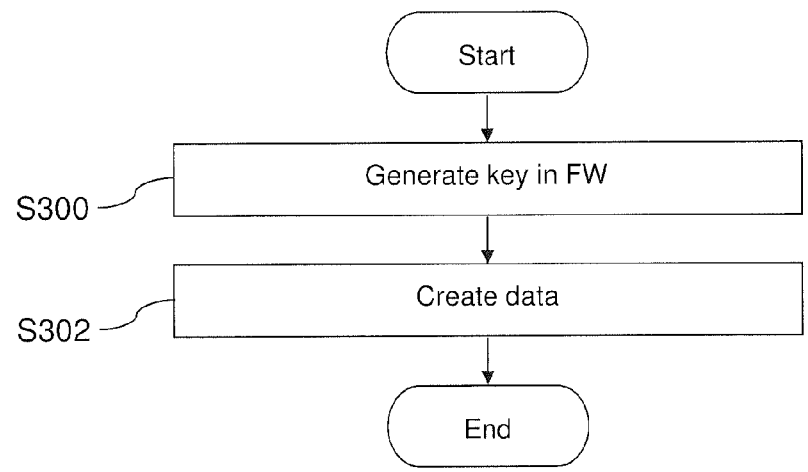
FIG. 12 is a flowchart of OS to OS communication for local writing in a new local memory section according to another embodiment of the invention.

FIG. 12 shows a flowchart of a communication between a first computer system and a second computer system for local writing in a new local memory section according to another embodiment of the invention. For this purpose in step S300 the second OS generates a key for encrypted data in the firmware that is planned to be used for the data. Next in step S302 data are created and stored in the planned area, encrypted by the key that was generated.

Figure 13:
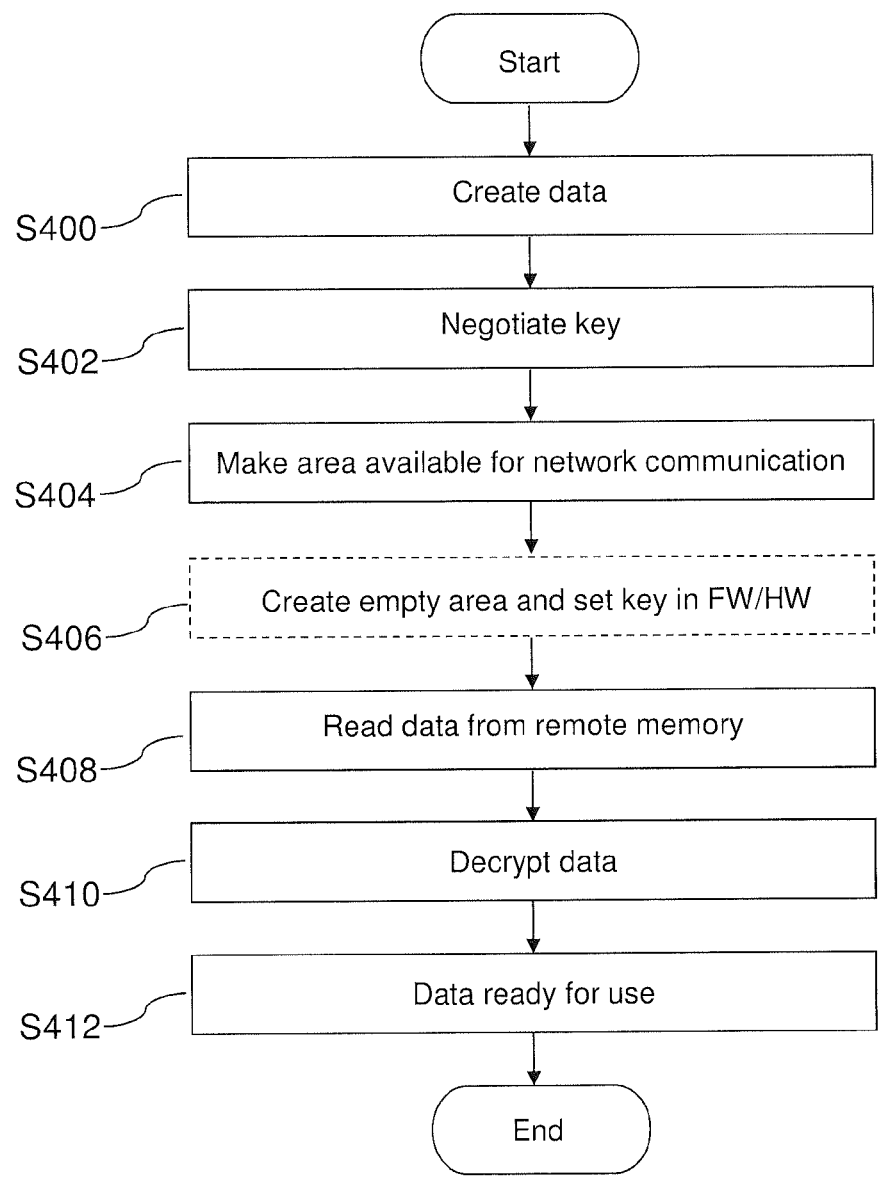
FIG. 13 is a flowchart of OS to OS communication for reading from a shared remote memory according to another embodiment of the invention.

In FIG. 13 a flowchart of a communication between a first computer system and a second computer system for reading from a shared remote memory according to another embodiment of the invention is depicted. First, data are created on the second OS in step S400. Next both OS negotiate their keys in step S402, where the first OS is to receive the key from the second OS. Then in step S404 the second OS makes the memory area available for network communication. Optionally, in step S406, the first OS creates an empty memory area and sets the encryption key in a segment table or page table stored in the FW/HW. Next in step S408 data are read from the remote memory by the first OS, followed by the decryption of the data by the first OS in step S410. This is not necessary if step S406 has been performed. In step S412 the data are ready for use on the first computer system.

Figure 14:
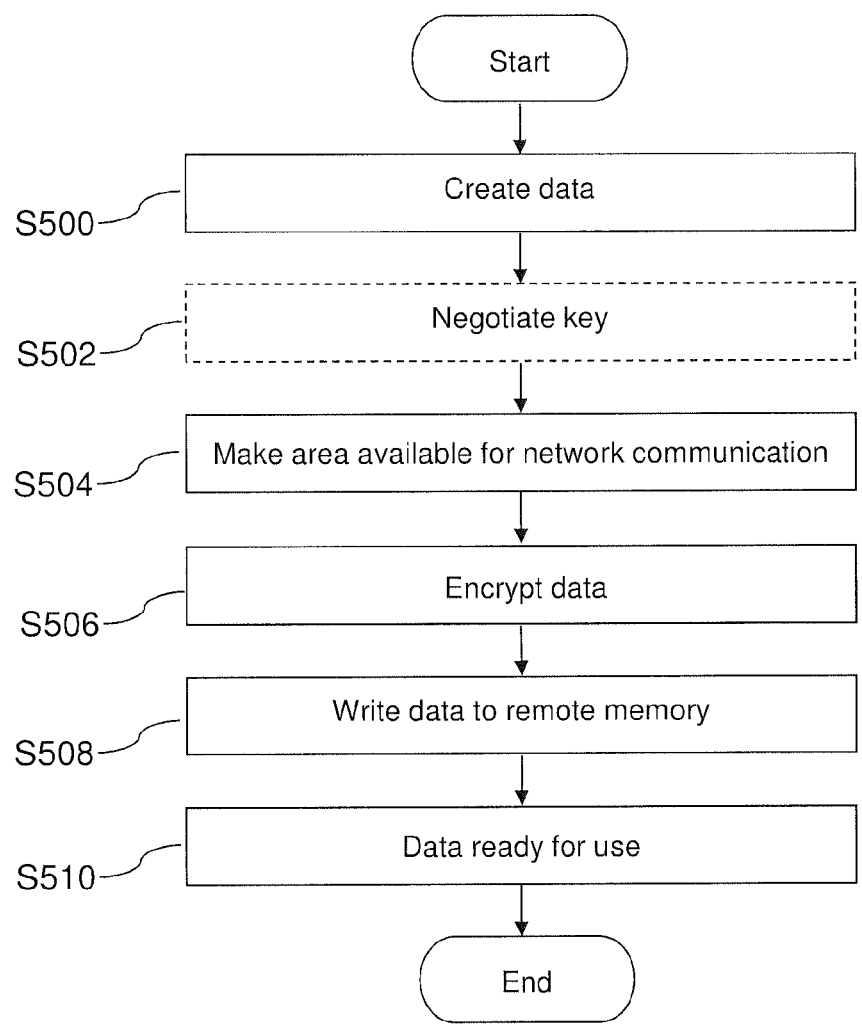
FIG. 14 is a flowchart of OS to OS communication for writing to a shared remote memory according to a further embodiment of the invention.

FIG. 14 depicts a flowchart of a communication between a first computer system and a second computer system for writing to a shared remote memory according to a further embodiment of the invention. First in step S500 data are created on the first OS. Next in step S502 the keys are negotiated by the OS, which means that the first OS is to receive the key from the second OS. In step S504 the second OS makes memory area available to network communication, whereas in step S506 the data are encrypted with the key by the first OS. In step S508 the data are written to the remote memory by the first OS and in step S510 the data are ready for use by the second OS in the memory. The keys may be reused, thus a new negotiation is not required in any case. Therefore step S502 is marked as optional in the flowchart in FIG. 14.

Figure 15:
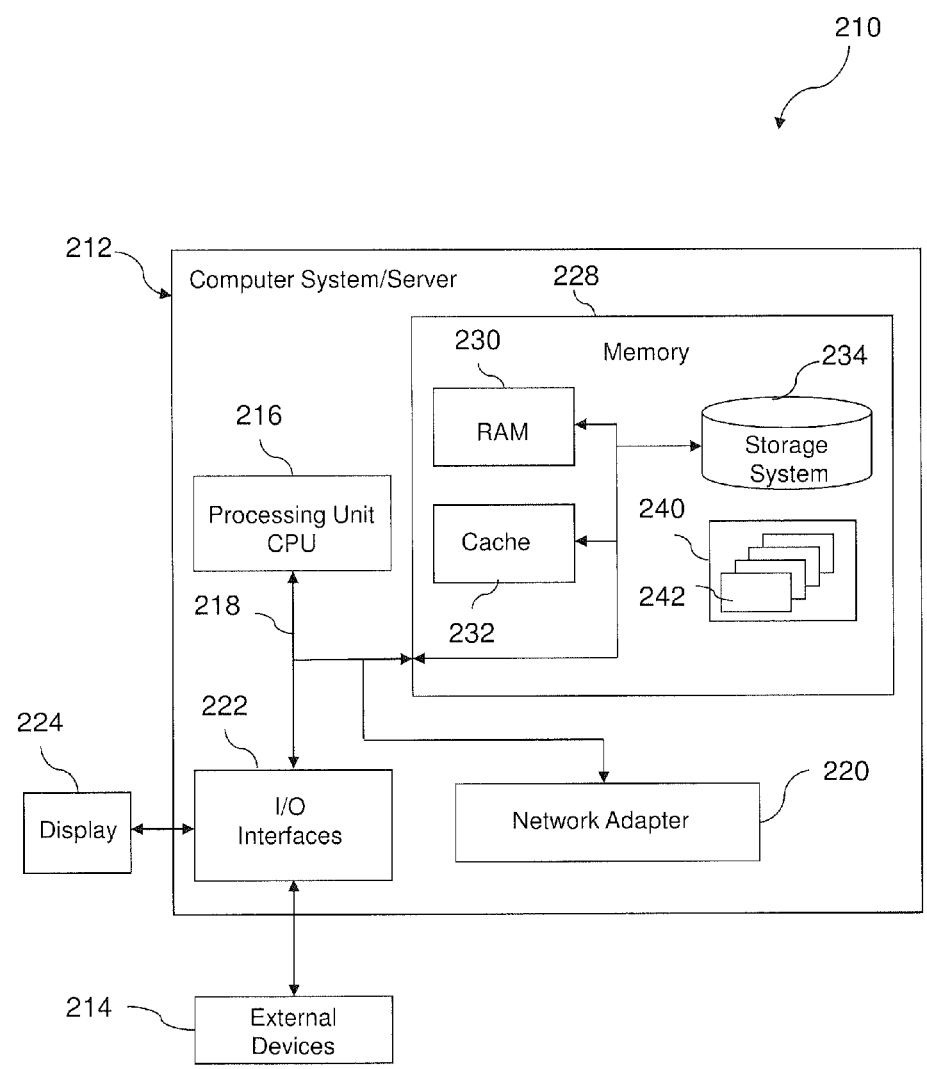
FIG. 15 is an example embodiment of a data processing system for executing a method according to an embodiment the invention.

Referring now to FIG. 15, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the 1

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232.

Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

In accordance with an embodiment, a method is proposed for encrypting data exchanged between two computer systems with a network encryption key, the computer systems each comprising one or more processing units and a memory as well as at least one of the computer systems comprising at least one crypto unit, wherein at least one of the processing units of one of the computer systems accesses the memory via memory addresses. The content of the memory in the computer system, being written by at least one of its processing units, is configured to be encrypted by its crypto unit using a memory encryption key. Further the content of the memory, being read by at least one of its processing units, is configured to be decrypted by its crypto unit using the same memory encryption key. The computer systems further comprise at least one I/O adapter each to establish remote direct memory access via memory addresses between the computer systems. The method comprises at least one computer system locally storing the respective network encryption keys as memory encryption keys for memory areas used for the data exchange.

An embodiment of the method is based on an encryption mechanism extended to also handle RDMA type network traffic and storage traffic. The method adds a mechanism which enables I/O adapters to access the metadata required for the I/O adapter operation. Control and network addressing (e.g., control blocks, interrupt requests, pointers, IP addresses) is performed with unencrypted data, whereas user data are encrypted by the encryption mechanism. In addition the inventive method comprises the extension of existing extended key exchange methods, which is advantageous to setup encrypted RDMA connections.

According to an embodiment the operating systems (OS) of the computer systems negotiate their network encryption keys. The operating system saves network encryption keys and the network data source/target areas to a memory key table via a firmware/hardware instruction (firmware/hardware instruction). The hardware (HW) stores encrypted network traffic directly to the memory by using encrypted RDMA, as transmitted. When the network data is accessed by a processor unit via a cache, the cache decrypts the data via the crypto unit of the respective computer system using the network encryption key in its memory key table. Thus no separate encryption/decryption of the network traffic by the operating system is required.

Embodiments also include a computer program product for encrypting data exchanged between two computer systems with a network encryption key, the computer systems each comprising one or more processing units and a memory as well as at least one of the computer systems comprising at least one crypto unit, wherein at least one of the processing units of one of the computer systems accesses the memory via memory addresses. The content of the memory in the computer system, being written by at least one of its processing units, is configured to be encrypted by its crypto unit using a memory encryption key. Further the content of the memory, being read by at least one of its processing units, is configured to be decrypted by its crypto unit using the same memory encryption key. The computer systems further comprise at least one I/O adapter each to establish remote direct memory access via memory addresses between the computer systems. The computer program product is comprising a computer readable storage medium having program instructions embodied therewith, the program instructions executable by the computer systems to cause the computer systems to perform a method comprising at least one computer system locally storing the respective network encryption keys as memory encryption keys for memory areas used for the data exchange.

Further embodiments include a data processing system for execution of a data processing program, comprising computer readable program instructions for performing a method described above.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for encrypting data exchanged between two computer systems with a network encryption key, the computer systems each comprising one or more processing units and a memory and at least one of the computer systems comprising at least one crypto unit, the method comprising:

accessing content of a memory on one of the computer systems via a memory address, the accessing by at least one of the processing units of one of the computer systems;

based on the accessing being a write operation, encrypting the content of the memory using a memory encryption key, the encrypting by a crypto unit of the at least one of the processing units;

based on the accessing being a read operation, decrypting the content of the memory using the same memory encryption key, the decrypting by a crypto unit of the at least one of the processing units;

establishing remote direct memory access via memory addresses between the computer systems, the establishing including at least one of the computer systems locally storing a respective network encryption key as memory encryption keys for memory areas used for the data exchange;

based on storing new data to the memory:

an operating system communicating memory addresses as well as the corresponding network encryption key to firmware of the computer system; and the firmware modifying a memory segment table and creating or modifying a page table by setting a flag in the memory segment table and adding a pointer pointing to the page table as well as adding a page address, a network encryption key and an encryption type to the page table; and based on reading existing data from the memory, the operating system communicating memory addresses and reading the corresponding network encryption key from firmware of the computer system.

2. The method according to claim 1, further comprising operating systems of the computer systems negotiating network encryption keys for performing remote direct memory access of one of the computer systems to another computer system.

3. The method according to claim 1, further comprising one of the computer systems storing or reading data encrypted by the network encryption keys directly via remote direct memory access on the memory of another computer system.

4. The method according to claim 1, further comprising, based on encrypted data on the memory of one of the computer systems being accessed by one of the processing units via a cache, the cache decrypting the data via the crypto unit of the respective computer system using the network encryption key stored in its memory key table.

5. The method according to claim 1, wherein memory accesses are performed on a page granularity.

6. The method according to claim 1, further comprising crypto units of the computer systems being synchronized by exchanging the network encryption keys of shared memory areas for direct memory access of the computer systems.

7. The method according to claim 1, further comprising data being re-encrypted based on the network encryption keys being changed on a local computer system.

8. The method according to claim 1, further comprising, before accessing a local memory area by an input/output (I/O) adapter, retrieving the stored corresponding local memory encryption key for use by the corresponding local crypto unit to decrypt the area content in case it is read by the I/O adapter or to encrypt the local area content in case it is written by the I/O adapter.

9. The method according to claim 1, wherein the crypto unit is configured with an access selector for selecting encrypted access or unencrypted access from the I/O adapter.

10. The method according to claim 1, wherein the I/O adapter is configured for selecting an access to unencrypted data of the crypto unit or an access to encrypted data in the memory.

11. A system for encrypting data exchanged between two computer systems with a network encryption key, the two computer systems including the system, the system comprising: the computer systems each comprising one or more processing units and a memory and at least one of the computer systems comprising at least one crypto unit, the system configured to execute computer readable instructions comprising:

a second memory having computer readable instructions; and a processor for executing the computer readable instructions, the computer readable instructions including:

accessing content of a memory on one of the computer systems via a memory address, the accessing by at least one of the processing units of one of the computer systems;

based on the accessing being a write operation, encrypting the content of the memory using a memory encryption key, the encrypting by a crypto unit of the at least one of the processing units;

based on the accessing being a read operation, decrypting the content of the memory using the same memory encryption key, the decrypting by a crypto unit of the at least one of the processing units;

establishing remote direct memory access via memory addresses between the computer systems, the establishing including at least one of the computer systems locally storing a respective network encryption key as memory encryption keys for memory areas used for the data exchange;

based on storing new data to the memory:

an operating system communicating memory addresses as well as the corresponding network encryption key to firmware of the computer system; and the firmware modifying a memory segment table and creating or modifying a page table by setting a flag in the memory segment table and adding a pointer pointing to the page table as well as adding a page address, a network encryption key and an encryption type to the page table; and based on reading existing data from the memory, the operating system communicating memory addresses and reading the corresponding network encryption key from firmware of the computer system.

12. The system of claim 11, wherein the computer readable instructions further comprise operating systems of the computer systems negotiating network encryption keys for performing remote direct memory access of one of the computer systems to another computer system.

13. The system of claim 11, wherein the computer readable instructions further comprise one of the computer systems storing or reading data encrypted by the network encryption keys directly via remote direct memory access on the memory of another computer system.

14. A computer program product for encrypting data exchanged between two computer systems with a network encryption key, the computer systems each comprising one or more processing units and a memory and at least one of the computer systems comprising at least one crypto unit, the computer program product comprising:
- a non-transitory computer readable storage medium having program instructions embodied therewith, the program instructions executable by a processor to cause the processor to perform:
- accessing content of a memory on one of the computer systems via a memory address, the accessing by at least one of the processing units of one of the computer systems;
- based on the accessing being a write operation, encrypting the content of the memory using a memory encryption key, the encrypting by a crypto unit of the at least one of the processing units;
- based on the accessing being a read operation, decrypting the content of the memory using the same memory encryption key, the decrypting by a crypto unit of the at least one of the processing units;
- establishing remote direct memory access via memory addresses between the computer systems, the establishing including at least one of the computer systems locally storing a respective network encryption key as memory encryption keys for memory areas used for the data exchange;
- based on storing new data to the memory:
- an operating system communicating memory addresses as well as the corresponding network encryption key to firmware of the computer system; and
- the firmware modifying a memory segment table and creating or modifying a page table by setting a flag in the memory segment table and adding a pointer pointing to the page table as well as adding a page address, a network encryption key and an encryption type to the page table; and
- based on reading existing data from the memory, the operating system communicating memory addresses and reading the corresponding network encryption key from firmware of the computer system.

* * * * *